(12) United States Patent
Ridenour, III et al.

(10) Patent No.: US 9,372,478 B2
(45) Date of Patent: Jun. 21, 2016

(54) CONTROL SYSTEM FOR A POWER APPLICATION

(75) Inventors: Harry Paul Ridenour, III, Salem, VA (US); Sunil Keshava, Karnataka (IN); Raghavendra Rao Perampalli Nekkar, Singapore (SG)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1163 days.

(21) Appl. No.: 13/343,339

(22) Filed: Jan. 4, 2012

(65) Prior Publication Data

US 2013/0173072 A1  Jul. 4, 2013

(51) Int. Cl.
*G06F 1/26* (2006.01)
*G05B 19/042* (2006.01)
*H04L 12/64* (2006.01)

(52) U.S. Cl.
CPC .......... *G05B 19/042* (2013.01); *H04L 12/6418* (2013.01)

(58) Field of Classification Search
CPC . H04L 12/6418; G05B 19/042; Y02E 10/723
USPC .................... 340/3.21; 700/287, 14
See application file for complete search history.

(56) References Cited

U.S. PATENT DOCUMENTS

| 3,786,470 | A | 1/1974 | Greenhill |
| 6,269,274 | B1 | 7/2001 | Steinman et al. |
| 7,415,697 | B1 | 8/2008 | Houlding |
| 7,559,060 | B2 | 7/2009 | Schmidt et al. |
| 7,825,642 | B1 | 11/2010 | Young et al. |
| 2008/0107136 | A1 | 5/2008 | Joo et al. |
| 2011/0054640 | A1* | 3/2011 | Law et al. ........................ 700/14 |
| 2011/0071692 | A1* | 3/2011 | D'Amato et al. ............. 700/291 |

FOREIGN PATENT DOCUMENTS

EP  0573186 A2  12/1993

OTHER PUBLICATIONS

Search Report and Written Opinion from corresponding EP Application No. 12199194.7, dated Mar. 28, 2013.

(Continued)

*Primary Examiner* — Edwin Holloway, III
(74) *Attorney, Agent, or Firm* — GE Global Patent Operation

(57) ABSTRACT

A control system for a power application is provided, including a control module and a configuration tool. The control module is in communication with the power application. The control module includes control logic for controlling the power application by a plurality of frame states. All of the frame states are executed within a period of time referred to as a frame rate. The control module includes control logic for allotting an adjustable amount of time for each of the frame states. The configuration tool is in communication with the control module. The configuration tool includes control logic for modifying the adjustable amount of time of each of the plurality of frame states without modifying the frame rate.

19 Claims, 2 Drawing Sheets

(56) References Cited

OTHER PUBLICATIONS

Energy Development and Power Generation Committee of the IEEE Power Engineering Society, "IEEE Application Guide for Distributed Digital Control and Monitoring for Power Plants", IEEE Standard 1046-1991, Jan. 1, 1991, XP017602559, ISBN: 978-0-7381-1106-3.

Andrianiaina, Patrick Jocelyn et al.,"Robust control under weakened real-time constraints", Decision and Control and European Control Conference (CDC-ECC), 2011 50th IEEE Conference, Dec. 12, 2011, pp. 2016-2021, XP032122950, ISBN: 978-1-61284-800-6.

\* cited by examiner

CONTROL SYSTEM FOR A POWER APPLICATION

BACKGROUND OF THE INVENTION

The subject matter disclosed herein relates to a system for controlling a power application, and more specifically to a system for controlling a power application having a configuration tool including control logic for modifying an adjustable amount of time of a frame state.

A control module is provided for operating a power application such as, for example, gas turbines, steam turbines, wind turbines, aero-derivative gas turbine, or plant distributed control systems (DCS). The control module includes control logic for reading inputs, executing an application, and writing outputs within a time period commonly referred to as a frame. The frame is defined into smaller units of time referred to as frame states. A frame state allows for the control module to perform one particular activity such as reading an input, executing the application, or writing an output. In one example there are four frame states, input, output, application and idle. The amount of time allotted for the execution of each frame state is referred to as a frame state timeout interval.

The frame state timeout intervals for each of the frame states are fixed and may not be changed. Thus, irrespective of the power application, the frame state timeout intervals each remain the same even though the size of the input and output points as well as the size of the application varies between power applications. For example, if the application frame state is relatively larger and more time consuming than the input, there is no way to utilize the extra input time that is allotted to accommodate the large application frame state. Moreover, even if the input, application, or outputs exceed the frame state timeout interval, there is usually no way to utilize the idle frame state timeout interval to accommodate the overrunning frame state timeout interval. As a result all of the input points may not be fetched, the application may not be executed accurately, or the output points may not be signaled correctly. Moreover, there is no simple approach for an end-user to monitor the control module as the application is executing. Thus, an end-user is usually unable to determine which frame state does not have sufficient time to execute, or which frame state has unused time.

In one approach, the frame state timeout intervals are modified by the control module system developers. Specifically, the system developers modify the frame state timeout intervals based on the specific requirements of a power application, re-build the firmware of the control module, re-release the software toolset for the control module, and make a release of the new firmware available to customers. This process is cumbersome, time consuming, and relatively expensive.

In another approach, the frame state timeout intervals are adjusted based on a specific site's requirements. For example, if a first site had an input frame state that was being timed out, then the system developers modify the input frame state such that more time is allotted to the input frame state. If a second site has an output frame that was being timed out, then the system developers modify the output frame state such that more time is allotted to the output frame state. If a third site has an application frame that was being timed out, then the system developers modify the frame state timeout interval corresponding to the application frame state such that more time is being allotted to the application frame state. All of these approaches are relatively time consuming and complex.

BRIEF DESCRIPTION OF THE INVENTION

According to one aspect of the invention, a control system for a power application is provided, including a control module and a configuration tool. The control module is in communication with the power application. The control module includes control logic for controlling the power application by a plurality of frame states. All of the frame states are executed within a period of time referred to as a frame rate. The control module includes control logic for allotting an adjustable amount of time for each of the frame states. The configuration tool is in communication with the control module. The configuration tool includes control logic for modifying the adjustable amount of time of each of the plurality of frame states without modifying the frame rate.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
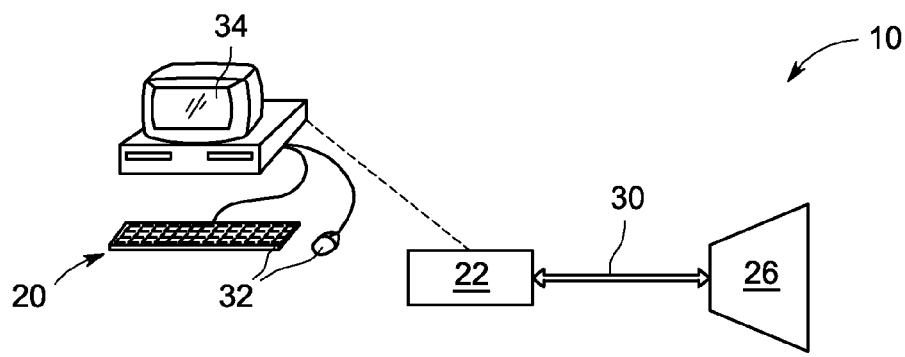
FIG. 1 is an exemplary illustration of a control system for controlling a power application.

Referring now to FIG. 1, an exemplary control system 10 is illustrated. The control system 10 includes a configuration tool 20 and a control module 22. The control module 22 is in communication with a power application 26. In the embodiment as illustrated, the power application 26 is a turbine such as, for example, a gas turbine, a steam turbine, a wind turbine, or an aero-derivative gas turbine. However, it is to be understood that the power application 26 may be a variety of applications, and the control system 10 may be employed in a variety of applications such as, for example, a plant distributed control system (DCS). The control system 10 exchanges messages between the control module 22 and the power application 26 over a data bus 30. Specifically, in one embodiment the data bus 30 is in communication with production equipment such as, for example, fuel valves, sensors, actuators, electrical motors, or valves (not shown) of the power application 26.

The control module 22 includes control logic for monitoring and controlling various functions of the power application 26. In one embodiment, the control module 22 is a turbine controller that is employed for controlling various functions of a turbine (not shown) such as fuel and emissions control.

The control module 22 includes an electrically erasable and reprogrammable memory such as, for example, flash memory that can be erased and reprogrammed repeatedly by the configuration tool 20. The configuration tool 20 is selectively connected to the control module 22 through a data connection for diagnostics. The configuration tool 20 reconfigures the control module 22, but does not alter the firmware of the control module 22. In the exemplary embodiment as shown, the configuration tool 20 is a personal computer, however it is to be understood that other computing devices may be used as well.

The configuration tool 20 includes an interface 32 for allowing an end-user to enter input. In the embodiment as illustrated, the interface 32 is a keyboard and a mouse device. The configuration tool 20 further includes a display 34. In one embodiment, the display 34 is a liquid crystal display ("LCD") screen, and is used to display graphics and text. The configuration tool 20 is in communication with both the interface 32 and the display 34, and includes control logic for generating a graphical signal that is shown on the display 34.

Figure 2:
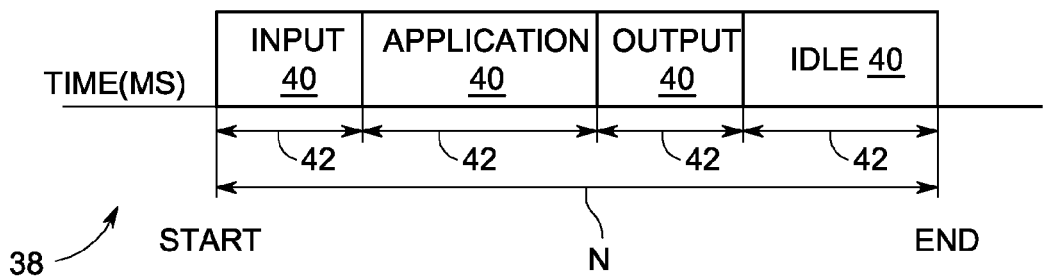
FIG. 2 is an exemplary illustration of a frame state as executed by the control system shown in FIG. 1.

FIG. 2 is an exemplary illustration of a single frame 38 that includes a frame rate N. The frame rate N represents the amount of time that is allotted for the frame 38 to execute. In one embodiment, the frame rate N is measured in milliseconds. The frame 38 is defined into smaller units of time that are labeled as frame states 40. The frame states 40 allow for the control module 22 to perform a particular activity such as, for example, reading an input, executing an application, or writing an output. In the example as shown, there are four frame states 40 which are labeled as 'Input', 'Output', 'Application', and 'Idle'. An adjustable amount of time allotted for the execution of each frame state 40 is referred to as a frame state timeout interval 42.

With reference to both FIGS. 1-2, the control module 22 includes control logic for reading an input, executing the application, and writing an output within the amount of time allotted by the frame rate N. Although the frame rate N allotted by frame 38 is fixed, the frame state timeout intervals 42 have an adjustable amount of time that may be modified. That is, the configuration tool 20 includes control logic for modifying the frame state timeout interval 42 of the frame states 40, based on the requirements of the power application 26. Specifically, the configuration tool 20 includes control logic for creating one or more configuration files to the control module 22 that modify the frame state timeout interval 42 of the frame states 40 based on the requirements of the power application 26. The configuration tool 20 includes control logic for transferring one or more configuration files to the control module 22. The control module 22 includes control logic for accepting the configuration files, and upon acceptance, the control module 22 includes control logic for rebooting. During startup, the control module 22 includes control logic for reading and executing the modified frame state timeout intervals 42 of the frame states 40. Specifically, the control module 22 executes the modified frame state timeout intervals 42, without the need to change the overall execution period of the control system 10.

Figure 3:
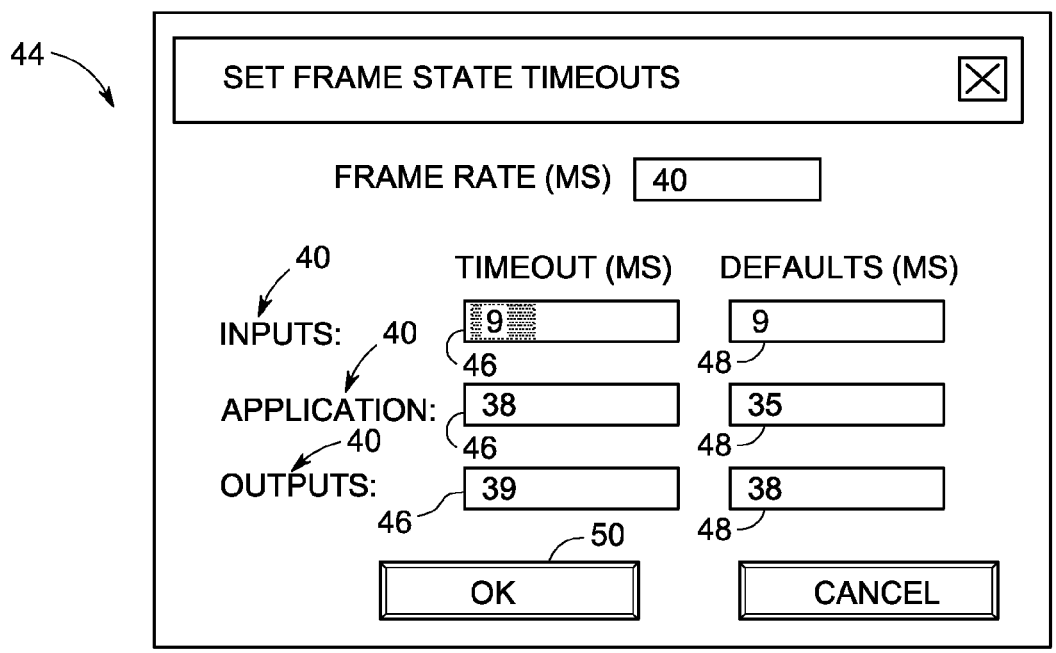
FIG. 3 is an exemplary illustration of a user interface graphic that is shown on a display of a configuration tool shown in FIG. 1.

FIG. 3 is an exemplary illustration of a user interface graphic 44. In one embodiment of the control system 10, the control module 22 includes control logic for generating a graphic signal representing the user interface graphic 44. The display 34 (FIG. 1) shows the graphic signal representing the user interface graphic 44, which is viewable to an end-user. The user interface graphic 44 includes information regarding the frame state timeout intervals 42 (shown in FIG. 2) for the Input frame state 40, the Application frame state 40, and the Output frame state 40. Specifically, the user interface graphic 44 displays a plurality of input fields 46 regarding the Input, the Application, and the Output frame states 40. The plurality of input fields 46 display a modifiable amount of time that is allotted for each of the frame states 40.

Referring now to both FIGS. 1 and 3, an end-user enters an input using the interface 32 to modify one of the input fields 46. For example, referring specifically to FIG. 3, one of the input fields 46 has been highlighted such that an end-user may modify the value '9' that is currently located in the input field 46 corresponding to the Input frame state 40. The user interface graphic 44 also includes a plurality of default fields 48. Specifically, each of the Input, the Application, and the Output frame states 40 include a default field 48 that displays a default value of the respective frame state timeout intervals 42 (shown in FIG. 2). Once the input fields 46 have been updated, an end-user then selects an 'OK' button 50. The configuration tool 20 then sends the modified frame state timeout intervals 42 as configuration files to the control module 22. The control module 22 includes control logic for accepting the configuration files, and upon acceptance, the control module 22 includes control logic for rebooting. During startup, the control module 22 includes control logic for executing a program with the modified frame state timeout intervals 42. Thus, the frame state timeout intervals 42 (shown in FIG. 2) may be modified by an end-user depending on the needs of the power application 26 (shown in FIG. 1). For example, in the event a specific power application 26 requires a relatively long frame state timeout interval 42 for the Input frame state 40 and a relatively short frame state timeout interval 42 for the Application frame state 40, an end-user increases the frame state timeout interval 42 for the Input frame state 40 while at the same time decreasing the frame state timeout interval 42 for the Application frame state 40.

With reference to FIGS. 1-3, modifying the frame state timeout intervals 42 affects the execution of the control system 10. Therefore, in one embodiment of the control system 10, the configuration tool 20 requires a password to obtain access to the user interface graphic 44. That is, the configuration tool 20 includes control logic for providing password protection in the event at least one of the frame state timeout intervals 42 are to be modified. Password protection provides a level of protection against an unauthorized user that obtains access to the configuration tool 20, and modifies the frame state timeout intervals 42 without the requisite knowledge that is needed to make such a modification.

With continued reference to FIGS. 1-3, both of the configuration tool 20 and the control module 22 each include control logic for protecting against incorrect timeout intervals as well. Specifically, the configuration tool 20 includes control logic for validating any modified values that are inputted into one or more of the input fields 46 (shown in FIG. 2). Specifically, the configuration tool 20 includes control logic for determining if the modified values of any of the frame state timeout intervals 42 would cause an incorrect timeout condition.

One example of an incorrect timeout example involves an end-user entering the value '12' into the input field 46 corresponding to the Input frame state 40 (shown in FIG. 3). This means that twelve milliseconds are allotted for the frame state timeout interval 42 corresponding to the Input frame state 40. However, if the frame rate N for the frame 38 is only ten milliseconds, this means that the other frame states 40, such as the Application frame state 40 and the Output frame state 40, are not executed. Thus, the configuration tool 20 includes control logic for determining if the modified values of any of the frame state timeout intervals 42 would cause an incorrect timeout condition. The configuration tool 20 further includes control logic for transferring the configuration files to the control module 22 only if the modified values of the frame state timeout intervals 42 do not create an incorrect timeout condition. The control module 22 also includes control logic for determining if any of the modified values of the frame state timeout intervals 42 create an incorrect timeout condition. In the event the control module 22 determines that any of the modified values of the frame state timeout intervals 42 create an incorrect timeout condition, then the control module 22 includes control logic for using the default values 48 for each of the Input, the Application, and the Output frame states 40 (which is shown in FIG. 3 as the default field 48). Thus, the control system 10 provides a double layer of protection to substantially prevent an incorrect timeout condition.

Figure 4:
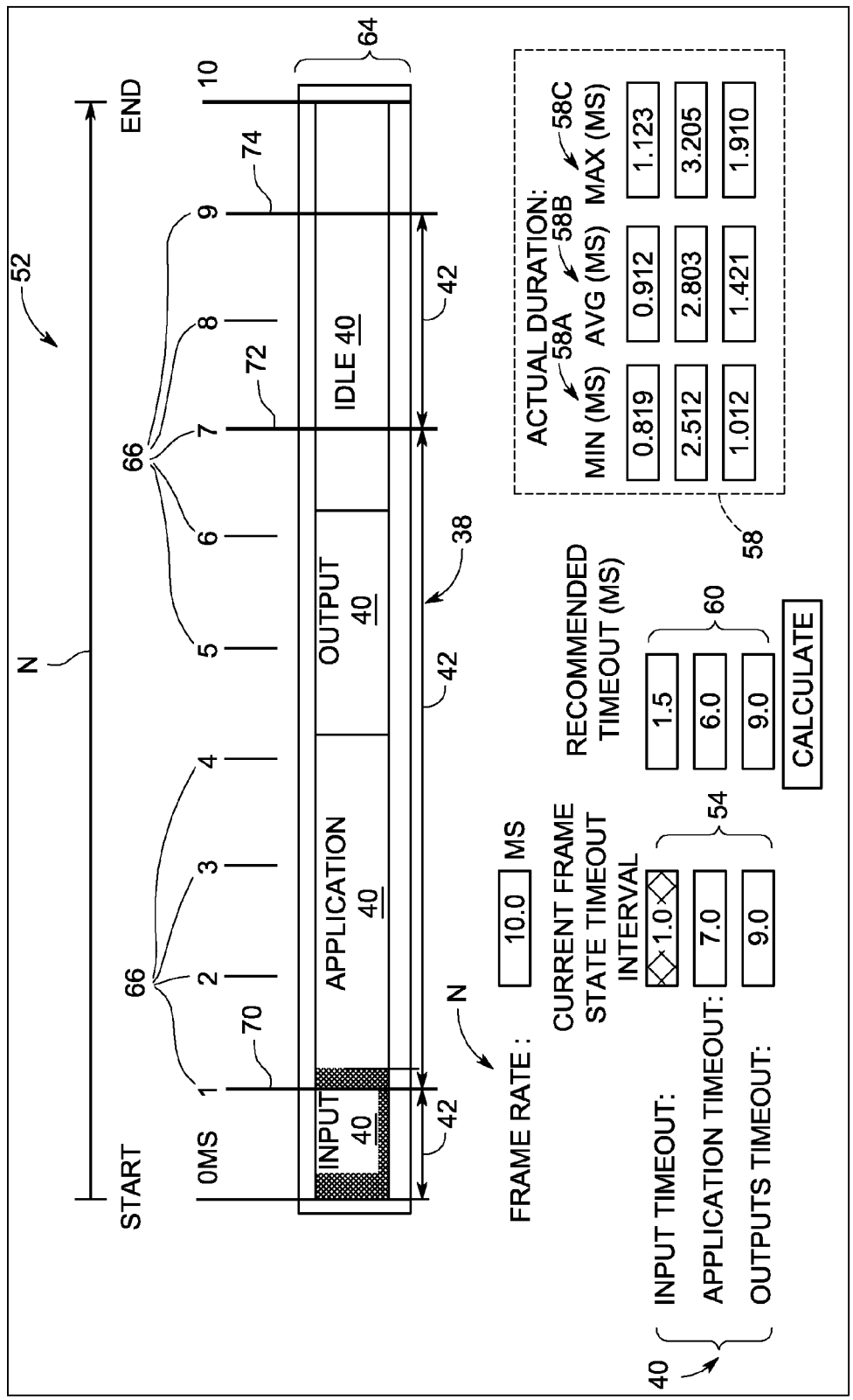
FIG. 4 is an exemplary illustration of a frame state analysis that is shown on the display of the configuration tool shown in FIG. 1.

FIG. 4 is an exemplary illustration of a frame state analysis 52. In one embodiment of the control system 10, the configuration tool 20 (shown in FIG. 1) includes control logic for generating a graphic signal representing the frame state analysis 52, and the display 34 (shown in FIG. 1) shows the graphic signal representing the frame state analysis 52. The frame state analysis 52 provides an end-user with the ability to view the frame state timeout intervals 42 as the control module 22 executes a program. In the exemplary embodiment as shown in FIG. 4, the frame rate N allotted for the frame 38 is about 10 milliseconds. The frame state analysis 52 displays a current frame state timeout interval 54, which indicates the current amount of time that is allotted for each of the frame states 40. In the example as illustrated, the Input frame state 40 is allotted about 1.0 millisecond, the Application frame state 40 is allotted about 7.0 milliseconds, and the Output frame state 40 is allotted about 9.0 milliseconds.

The control module 22 (shown in FIG. 1) includes control logic for monitoring the execution of the program and determining the actual duration of each of the frame states 40. Specifically, a sequencer (not shown in FIG. 1) of the control module 22 calculates a minimum, average, and maximum amount of time that each frame state 40 actually takes to execute, and transfers this information to the configuration tool 20 (shown in FIG. 1). In the example as shown in FIG. 4, an 'Actual Duration' section is shown and is indicated with reference number 58. The Actual Duration box 58 includes a column for displaying a minimum time 58A, an average time 58B, and a maximum time 58C for each frame state 40. In the embodiment as shown in FIG. 4, the Input frame state 40 has a minimum time 58A of about 0.819 milliseconds, an average time 58B of about 0.912 milliseconds, and a maximum time 58C of about 1.123 milliseconds. The sequencer of the control module 22 may also determine the actual start and end times of the frame 38, which is also sent to the configuration tool 20.

The configuration tool 20 includes control logic for calculating a Recommended Timeout 60 (based in milliseconds) based on the minimum time 58A, the average time 58B, and the maximum time 58C. Alternatively, in another embodiment the configuration tool 20 may include control logic for employing a standard deviation as well. The Recommended Timeout 60 provides an end-user with a guide as to how the modify the input field 46 of one or more of the frame states 40 using the user interface graphic 44 (shown in FIG. 3).

The frame state analysis 52 also includes a graphical indicator 64 illustrating the actual duration of each of the frame states 40 as the program executes. The graphical indicator 64 includes a plurality of tick or indication marks 66 which aid an end-user in determining if one or more of the frame states 40 have exceeded the current frame state timeout interval 42. A plurality of timeout indicators are also illustrated, where the Input frame state 40 includes an Input timeout indicator 70, the Application frame state 40 includes an Application timeout indicator 72, and the Output frame state 40 includes an Output timeout indicator 74. In the example as shown in FIG. 4, the Input timeout indicator 70 is at about 1 ms, the Application timeout indicator 72 is at about 7 ms, and the Output timeout indicator 74 is at about 9 ms.

FIG. 4 illustrates the Input frame state 40 finishing execution at about 1.2 milliseconds. However, as shown in the current frame state timeout interval 54, the Input frame state 40 is allotted about 1.0 millisecond, and is supposed to finish executing at 1.0 millisecond. Thus, as seen in the graphical indicator 64, the Input frame state 40 exceeds the amount of time that is allotted by about 0.2 milliseconds. Because the Input frame state 40 exceeds the amount of time that has been allotted, the configuration tool 20 may include control logic for shading or coloring the Input frame state 40 to indicate an out of range condition. The Application frame state 40 finishes executing at about 4.4 milliseconds. However, as shown in the current frame state timeout interval 54, the Application frame state 40 is allotted until about 7.0 milliseconds to execute. In the example as shown, the Output frame state 40 finishes executing at about 6.3 milliseconds. However, as shown in the current frame state timeout interval 54, the Output frame state 40 is allotted until about 9.0 milliseconds to execute. As seen in the Recommended Timeout 60, because the Input frame state 40 exceeds the frame state timeout interval 42 by about 0.2 milliseconds, the Recommended Timeout 60 suggests increasing the current frame state timeout interval 54 by about 0.5 milliseconds.

With reference to FIGS. 1-4, the control system 10 allows for an end-user to adjust the frame state timeout intervals 42 of the Input frame state 40, the Application frame state 40, the output frame state 40, and the Idle frame state 40. That is, the frame state timeout intervals 42 of the frame states 40 may be modified depending on the type of power application 26, without the need to modify the firmware of the control module 22. Some other types of control systems that are currently available usually require system developers to modify the frame state timeout intervals based on the specific power application and re-build the firmware of the control module, which becomes time consuming and costly. Moreover, the control system 10 also provides an end-user with the ability to provide one type of control module that is common among different power applications 26 (i.e., gas turbines, steam turbines, wind turbines, aero-derivative gas turbines, or DCS systems). In contrast, control systems that are currently available generally involve building different types of control modules to accommodate the needs of various types of power applications. Moreover, with reference to FIG. 4, the frame state analysis 52 also provides an end-user with the ability to monitor and observe the actual duration of each of the frame states 40 as the program executes on the control module 22. Thus, an end-user has the ability to identify and address a potential frame state 40 time out condition before an issue arises.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A control system for a turbine, comprising:
a control module in communication with the turbine, the control module including:
a control logic for controlling the turbine by a plurality of frame states, all of the plurality of frame states being executed within a period of time referred to as a frame rate;
a control logic for allotting an adjustable amount of time for each of the plurality of frame states; and
a configuration tool in communication with the control module, the configuration tool including control logic for modifying the adjustable amount of time of each of the plurality of frame states without modifying the frame rate;
wherein the configuration tool includes control logic for calculating a recommended timeout interval for each of the plurality of frame states that is based at least in part on a minimum amount of time, an average amount of time, and a maximum amount of time of each of the plurality of frame states.

2. The control system as recited in claim 1, wherein the plurality of frame states include reading an input, executing an application, and writing an output.

3. The control system as recited in claim 2, wherein the frame rate further includes an idle frame state that is allotted the adjustable amount of time.

4. The control system as recited in claim 1, wherein the control module includes control logic for determining an actual duration of each of the plurality of frame states.

5. The control system as recited in claim 4, wherein the control module includes a sequencer that determines a minimum amount of time, an average amount of time, and a maximum amount of time for each of the plurality of frame states based on the actual duration of each of the plurality of frame states, and wherein the control module transfers the minimum amount of time, the average amount of time, and the maximum amount of time of each of the plurality of frame states to the configuration tool.

6. The control system as recited in claim 1, wherein the configuration tool includes control logic for generating a graphical signal that is a frame state analysis, wherein the frame state analysis indicates the minimum amount of time, the average amount of time, and the maximum amount of time of each of the plurality of frame states, and the recommended timeout interval for each of the plurality of frame states.

7. The control system as recited in claim 6, wherein the frame state analysis illustrates an actual duration of each of the plurality of frame states.

8. The control system as recited in claim 7, wherein the configuration tool includes a display, and wherein the graphical signal that is the frame state analysis is shown on the display.

9. The control system as recited in claim 1, wherein the configuration tool includes a display, and wherein the configuration tool further includes control logic for generating another graphical signal indicating a user interface graphic, wherein the user interface graphic indicates a plurality of input fields regarding the plurality of frame states, wherein the plurality of input fields show the adjustable amount of time for each of the plurality of frame states.

10. The control system as recited in claim 9, wherein the configuration tool further includes an interface for receiving an input, wherein the input is entered into the plurality of input fields to create a modified adjustable amount of time for each of the plurality of frame states.

11. The control system as recited in claim 10, wherein at least one of the control module and the configuration tool include control logic for the determining if the modified adjustable amount of time for each of the plurality of frame states creates an incorrect timeout condition.

12. The control system as recited in claim 1, wherein the configuration tool includes control logic for providing password protection if the adjustable amount of time is modified for at least one of the plurality of frame states.

13. A control system for a turbine, comprising:
a control module in communication with the turbine, the control module including:
a control logic for controlling the turbine by a plurality of frame states that include reading an input, executing an application, and writing an output, the plurality of frame states being executed within a period of time referred to as a frame rate;
a control logic for allotting an adjustable amount of time for each of the plurality of frame states;
a control logic for determining an actual duration of each of the plurality of frame states; and
a configuration tool in communication with the control module, the configuration tool including control logic for modifying the adjustable amount of time of each of the plurality of frame states without modifying the frame rate;
wherein the configuration tool includes control logic for calculating a recommended timeout interval for each of the plurality of frame states that is based at least in part on a minimum amount of time, an average amount of time, and a maximum amount of time of each of the plurality of frame states.

14. The control system as recited in claim 13, wherein the control module includes a sequencer that determines a minimum amount of time, an average amount of time, and a maximum amount of time for each of the plurality of frame states based on the actual duration of each of the plurality of frame states, and wherein the control module transfers the minimum amount of time, the average amount of time, and the maximum amount of time of each of the plurality of frame states to the configuration tool.

15. The control system as recited in claim 13, wherein the configuration tool includes control logic for calculating a recommended timeout interval for each of the plurality of frame states that is based at least in part on a minimum amount of time, an average amount of time, and a maximum amount of time of each of the plurality of frame states.

16. The control system as recited in claim 15, wherein the configuration tool includes control logic for generating a graphical signal that is a frame state analysis, wherein the frame state analysis indicates the minimum amount of time, the average amount of time, and the maximum amount of time of each of the plurality of frame states, and the recommended timeout interval for each of the plurality of frame states.

17. The control system as recited in claim 16, wherein the frame state analysis illustrates an actual duration of each of the plurality of frame states.

18. The control system as recited in claim 17, wherein the configuration tool includes a display, and wherein the graphical signal that is the frame state analysis is shown on the display.

19. The control system as recited in claim 13, wherein the configuration tool includes a display, and wherein the configuration tool further includes control logic for generating another graphical signal indicating a user interface graphic, wherein the user interface graphic indicates a plurality of input fields regarding the plurality of frame states, wherein the plurality of input fields show the adjustable amount of time for each of the plurality of frame states.

* * * * *